(12) United States Patent
Khudenko et al.

(10) Patent No.: US 7,553,418 B2
(45) Date of Patent: Jun. 30, 2009

(54) METHOD FOR WATER FILTRATION

(75) Inventors: Boris M. Khudenko, Atlanta, GA (US); Rocco M. Palazzolo, Rosewell, GA (US); James R. Stafford, Smyrna, GA (US)

(73) Assignee: Khudenko Engineering, Inc., Atlanta, GA (US)

( * ) Notice: Subject to any disclaimer, the term of this patent is extended or adjusted under 35 U.S.C. 154(b) by 0 days.

(21) Appl. No.: 11/893,872

(22) Filed: Aug. 18, 2007

(65) Prior Publication Data
US 2009/0045135 A1     Feb. 19, 2009

(51) Int. Cl.
*C02F 3/00* (2006.01)
(52) U.S. Cl. .................. 210/601; 210/767; 210/800; 210/799; 210/695
(58) Field of Classification Search ........... 210/791, 210/806–807, 767, 601, 800, 799, 695, 661, 210/673
See application file for complete search history.

(56) References Cited

U.S. PATENT DOCUMENTS

| | | | | | |
|---|---|---|---|---|---|
| 3,814,247 | A * | 6/1974 | Hirs | ........................... | 210/793 |
| 4,326,964 | A * | 4/1982 | Hirs | ........................... | 210/793 |
| 6,048,459 | A * | 4/2000 | Khudenko | ................... | 210/617 |
| 7,329,344 | B2 * | 2/2008 | Jordan et al. | ............. | 210/195.1 |
| 7,347,942 | B2 * | 3/2008 | Cote et al. | ................... | 210/636 |
| 2003/0132160 | A1 * | 7/2003 | Khudenko | ................... | 210/605 |
| 2003/0159988 | A1 * | 8/2003 | Daigger et al. | ............. | 210/605 |
| 2006/0273007 | A1 * | 12/2006 | Zha et al. | ..................... | 210/636 |
| 2008/0029456 | A1 * | 2/2008 | Dueker et al. | ............... | 210/641 |

* cited by examiner

*Primary Examiner*—Chester T Barry

(57) ABSTRACT

This is a method of filtration of a liquid comprising steps of sequential filtration of said liquid through at least one deep bed medium producing at least one first filtrate followed by at least one membrane medium filtration producing at least one second filtrate, wherein said membrane medium is at least periodically within said deep bed media Many types of deep bed and membrane media can be used. The domain of using contact clarification (direct filtration) can be expanded towards greater solids concentration. Operation and backwash, is simplified, continuous filtration becomes possible. Water can be water from natural source water, process water, wastewater, aqueous or non-aqueous suspensions, emulsions, solutions. Treatment can include mechanical interception of suspended particles, chemical, physical chemical, electrochemical, and biological processes. In water and wastewater processing, control over suspended solids, BOD, COD, nitrogen and phosphorus compounds, bacteria and viruses, heavy metals, color, and other constituents can be dramatically improved as compared to conventional processes. The method can be accommodated in new and modified existing treatment systems.

35 Claims, 2 Drawing Sheets

METHOD FOR WATER FILTRATION

FIELD OF INVENTION

This is a method for filtration of liquids such as water (e.g., for potable water, and industrial process water), wastewater (e.g. sanitary, industrial, agricultural, feed lot, farm wastewater), and various industrial process streams (e.g., food processing, milk processing, beverages, fruit and berries juices, chemical processing, inorganic chemical processing, organic chemistry processing, petrochemical processing, production of synthetic fiber, production of natural and synthetic rubber, plastic production, pulp and paper, metals production, hydrometallurgical processes, metals treatment, chemical and electrochemical metals treatment, fertilizer production, mining and ore or coal beneficiation, gas and oil extraction, coal and oil coking, forest products processing, wood chemistry processing, lumber and wood treatment and processing, paint and varnish production, machine building and operation, automobile and rail transportation manufacturing and operations, aviation and space manufacturing and operation, biological processing, pharmaceutical processing, sea products processing, wool, cotton, flax, and leather processing, processing of construction materials, and any industry not listed herein that may use this technology and any new industry not known at the time of writing this specification) through a combination of deep bed and membrane media, wherein the membrane media is within the deep bed media at least at a portion of the operation time.

BACKGROUND OF INVENTION

Filtration methods and apparatus are described in numerous sources. The final stage of water purification at most of the existing water purification plants is so-called rapid filtration, also known as deep bed filtration, or depth filtration. Deep bed filtration methods have also been modified and adopted for the tertiary treatment of wastewater. Metcalf & Eddy, Wastewater Engineering, Treatment and Reuse, Fourth Edition, Revised by George Tchobanoglous, Franklin L. Burton, and H. David Stensel, McGraw Hill Book Company, 2003, provides a review of these methods.

Besides the removal of suspended solids and turbidity in the entire depth of the bed, these beds act as contact reactors for chemical, physical chemical and biological processes, for example: contact coagulation and improved suspended solids removal, removal of phosphorus with the addition of aluminum salts, BOD reduction due to the attached growth biological processes. The ability of the deep bed filters to perform as contact reactors is a significant advantage.

Membrane filters present a very efficient barrier for removal of suspended solids and turbidity, and additionally remove bacteria and even viruses. The latter is essentially a unique capability that can hardly be met by other means at this time. Membranes can be operated in low to high concentration suspensions.

Fine media, in deep bed filtration removes suspended solids and turbidity well, but the "dirt capacity" of fine media is low thus requiring frequent back washes and, therefore, large quantity of backwash water. Coarser media has increased "dirt capacity" and less frequent backwashes, but the treatment efficiency is lower. The use of coarse and fine media (dual, multiple, mixed, matrix media) can increase the "dirt capacity" as compared to fine media and provide the required suspended solids removal, but at a considerable increase in the system and its operation complexities.

A reasonable balance between treatment efficiency, frequency, intensity, and duration of backwash and the length and the rate of the filtration portion of the cycle can require a considerable volume of either fine, or coarse, or dual (multiple and other) media beds.

Deep bed filters with downflow through single (stratified or mixed), multiple (e.g. anthracite, sand, garnet, or ilmenite), matrix or carcass (about 2 m deep approximately 50 mm stone bed filled for about half depth by sand) media, with upflow through stratified granular media heavier than water, crossflow (horizontal flow) through vertically uniform deep bed media, dual-flux, respectively, from the top and from the bottom across the upper and bottom portions of the deep bed with filtrate collection means between the top and the bottom portions of the bed, continuous filtration with moving deep bed, and continuous filtration with periodic regeneration of the "spent" portion of the deep bed.

Most deep bed filters are operated semi-continuously with intermittent filtration and backwash periods. The flow in the filter can be classified as upflow, downflow, or crossflow. Two modes of operation, the declining or constant rate of filtration can be used, both modes present operational difficulties, particularly with the physical balancing of the total influent and effluent flows, and controlling the filtration rates in individual filters and among multiple filters.

Deep bed media require thorough backwash followed by a period of wasting the "first" filtrate having increased suspended solids and turbidity. The wasting of the first filtrate increases the percentage of water spent for the deep bed filter operation reducing the filter capacity. During the backwash, the period of filtration is interrupted, thus decreasing the capacity of filters. The backwash must be done using filtrate that further reduces the effective capacity of the deep bed filters.

If the suspended solids concentration in the raw water source is less than about 150 mg/l contact filtration can be used. Daniel Mints, an inventor of contact filtration, recommended the value of 150 mg/l. In practice, the actual values are typically less than 150 mg/l. At greater suspended solids concentrations, steps of coagulation, flocculation, and settling need to be conducted prior to filtration.

Systems for raw water distribution-filtrate collection, as well as for backwash water, and/or air distribution and spent backwash water collection are complex and expensive, mainly, due to the need of uniformly distributing the raw water and backwash water (and air) flows and collecting the filtrate and spent backwash water. Difficulties with controlling the uniformity of flows result in the size limitation for the deep bed filters, usually up to 6×6 m². Larger filters may be used at very large treatment plants, but often with compromised efficiency and/or large cost increase of water distribution-collection systems.

Membrane filtration for water purification and wastewater treatment has been more recently developed and applied. As the cost of membranes decreases, the technology is becoming affordable and is gaining popularity. Membrane filtration is used for treatment of low-to-highly concentrated suspensions and can produce virtually suspended solids and turbidity free effluents. For example, membranes are used in membrane bioreactors for biological treatment of wastewater with the concentration of mixed liquor suspended solids approximately 10 g/l. Plugging of membranes often occurs in such systems. The difficulty and the cost of membrane restoration is a disadvantage of such systems. Sometimes, conventional bioreactors with clarifiers are followed by membrane filtration. This reduces the required membrane surface and the capital and operating costs of membrane units, however, the bioreactor volume is not reduced. Sometimes, membranes are installed after deep bed filters, thus the periods between membrane regenerations are further increased. In the known membrane systems, admixtures to the water concentrate in a thin surface layer and often form mineral, organic, and biological deposits, for example, such as hard precipitates of hardness salts and metal phosphates, gels of metal hydroxides, and biological slimes. These deposits accumulate at, adhere to, and plug the pores on the membrane surface, thus reducing the filtration flux across the membrane. In some membrane systems, backpulses of filtrate and air scour are used for in-situ (continuous or very frequent) cleaning of the membrane surface. However, periodic chemical surface cleaning is also required; such cleaning is often done outside the main filtration system.

In contrast to deep bed filters, membranes do not provide reaction volume (deep bed) for removing many constituents of admixtures, and accumulation volume for the reactants and the products, including deposits. Accordingly, many objectives of water purification or tertiary treatment of wastewater cannot be achieved as effectively as in deep beds (e.g., BOD and COD reduction, phosphorus removal with metal salts, heavy metals removal in form of precipitates within the deep bed, and similar processes, in respect to the need in reaction volume and in retention means and contact media).

Membrane media concentrates many constituents of admixture in a thin layer at the surface where they can form deposits by themselves or by reacting with each other. Most common admixtures are (1) mineral precipitates forming gels like metal hydroxides, or hard precipitates in form of insoluble or poorly soluble metal carbonates and phosphates, (2) organic admixtures, for example, oily and fatty materials, and (3) biological slimes. These deposits plug membrane pores and reduce the filtration flux.

There are two modes of membrane cleaning: (1) on-going, usually including continuous or frequent air scour and periodic back pulses of filtrate (for hollow fiber media), and (2) periodic chemical treatment and restoration of membranes. These are complex procedures. Chemical treatment may shorten the life of membranes. In either case, the filtration capacity of membranes exposed to concentrated sticky deposits declines over time more rapidly than in cleaner environment.

OBJECTIVES

A combination of deep bed and membrane filtration of liquids in a single unit is presented in this invention. This combination provides synergistic effects that cannot be achieved in deep bed filters followed by membrane filters, although, all benefits (see above) of deep beds and membranes are preserved and disadvantages (see above) are eliminated. As a result, the new method provides simultaneous regeneration of both, deep bed and membrane, media without interrupting the membrane filtration period which produces water with the required quality; provides simple in-situ restoration of membrane surface without interrupting the filtration cycle; ensures longer filtration period between regenerations of the filtration media than either deep bed or membrane system can provide if used separately, said period is not interrupted during back wash; provides more efficient removal of admixtures; is capable of contact filtration of more concentrated water than in known contact filtration systems (up to 500 to 1000 mg/l for water purification); needs less deep bed media than conventional filters; can use coarse to very coarse media with increased dirt capacity while maintaining high efficiency of solids removal; uses less water for back wash that in known systems; does not need wasting of first filtrate, can use raw water for backwash; eliminates the filtration interruptions during the backwash; provides longer life time for membranes; and provides simpler and more economical systems and operations. Other advantages and objectives will become apparent from the ensuing specification and claims.

SUMMARY OF THE INVENTION

This is a method of liquid filtration comprising steps of sequential filtration of said liquid through one or more deep bed medium producing first filtrate followed by a membrane medium filtration producing second filtrate, wherein said membrane medium is at least periodically within said deep bed media. The membrane medium can be normally partially or completely (during filtration portion of the cycle) submerged into compacted deep bed media, or it can be normally (during filtration portion of the cycle) adjacent to the deep bed media and become submerged into expanded deep bed media during backwash.

The water as understood here may represent various aqueous and non-aqueous liquids and solutions, suspensions, emulsions, process liquids of various compositions and properties, and all fluids that can be treated with the use of deep bed and membrane filters. Particularly, but not exclusively, water treated by this method can be water from natural source water, process water, sanitary wastewater, industrial wastewater, aqueous suspension, aqueous emulsion, aqueous solution, and combinations thereof. The water treatment can include one of the following: removing of suspended solids, removing of organic suspended particles, removing of inorganic suspended particles, removal of turbidity, removal of dissolved organic matter, removal of BOD, removal of COD, removal of TOC, removal of dissolved inorganic matter, precipitation of dissolved solids as low soluble compounds, chemical oxidation of organic matter, chemical oxidation of inorganic matter, chemical reduction of organic matter, chemical reduction of inorganic matter, electrochemical oxidation of organic matter, electrochemical oxidation of inorganic matter, electrochemical reduction of organic matter, electrochemical reduction of inorganic matter, biological oxidation of organic matter, biological oxidation of inorganic matter, biological reduction of organic matter, biological reduction of inorganic matter, removal of heavy metals, removal of trace elements, removal of selenium, removal of toxic organic matter, removal of recalcitrant organic matter, removal of dyes, removal of color, removal of surfactants, removal of compounds determined as methylene blue, removal of oil and grease, removal of nitrogen containing compounds, removal of ammonia, removal of nitrates and nitrites, removal of phosphorus, removal of iron, removal of manganese, removal and utilization of heavy and precious metals, hydrometallurgical processing, processes with chemical, electrochemical, or physical chemical treatment of metal surfaces, removal of radioactive constituents, removal of calcium carbonate, removal of struvite, removal of bacteria, removal of viruses, and combinations thereof.

The bulk of the suspended solids and turbidity will be removed in deep bed filtration processes with the remaining being thoroughly removed by membrane filtration. The efficiency of particulate removal by the deep bed media need not be very thorough because the membrane medium will be scavenging the particles in the first filtrate. Accordingly, the deep bed medium can be coarser, thus providing longer filtration period, and the mass and the volume of the deep bed media can be significantly reduced as compared with conventional rapid filters.

The water flows across deep bed and membrane media under pressure differential due to applying pressure, applying vacuum, and combinations thereof. The step of applying vacuum can be by using vacuum pumps in combination with gravity transfer of said second filtrate, suction lines of water pumps, siphons, wells in combination with water pumps, wells in combination with gaslifts, and combinations thereof.

At least two deep bed media can be used in some method modifications, the first of two media is a floating medium, the second of two media is heavier than water or lighter than water but restrained, the first medium is forming an upper filtration bed and the second medium is forming the lower filtration bed, a membrane filtration element is positioned between upper and said lower beds, wherein water treatment comprises steps of downflow filtration across the upper bed and forming the upper first filtrate, and upflow filtration across lower bed forming the lower first filtrate, followed by filtration across said membrane filtration element forming second filtrate. The method, wherein the upper and the lower beds are dimensioned to form a gap filled by the first upper and first lower filtrates in the range from zero height to the height accommodating membrane elements. This is a modification of Mints' dual-flux filter distinct from the prior art by the use of two media types and the use of membrane medium for filtrate collection and fine filtration.

The volume of the deep bed media is subjected to the following steps of physical, physical-chemical, and chemical actions are applied to the volume of the deep bed: mechanical vibrations, ultrasound, mixing by water flows induced by water moving means, mixing by air flows, mixing by airlifts, mixing by gaslifts, bed expansion by water flows, bed expansion by air flows, aeration of the bed, application of electromagnetic fields with the use of external source of electric power, application of electromagnetic fields generated by heterogeneous electrochemical reactions within deep bed, application of at least one magnetic field with the use of electromagnets, application of at least one electromagnetic field with the use of permanent magnets, and combinations thereof.

The method, wherein at least two deep bed media are used, the first is a floating medium, the second is heavier or lighter than water but restrained, the first and the second media are mixed and the filtration step is provided through the mixed media.

The deep bed medium can be granular medium, sand, glass, crushed glass, ceramic, baked clay (ceramsite), crushed baked clay, crushed ceramic, plastic beads, metal beads, shaped ceramic elements, shaped ceramic elements, shaped glass elements, shaped ceramic elements, shaped plastic elements, shaped metal elements, fibrous elements, fibrous glass elements, fibrous ceramic elements, fibrous plastic elements, carbon fibers, fibrous metal elements, steel wool, rigid medium, flexible medium, medium that can be squeezed, floating medium, medium heavier than water, and combinations thereof.

This treatment method by water filtration through deep bed medium includes the following processes: mechanical interception of suspended solid particles, physical-chemical interception of suspended solid particles, physical chemical transformations of admixtures, coagulation, chemical transformations of admixtures, electrochemical transformation of admixtures, biological transformation of admixtures, biological growth, removal of nitrogen, removal of phosphorus, removal of recalcitrant organics, removal of endocrine disrupters, removal of color, removal of dyes, removal of BOD, removal of COD, removal of inorganic admixtures, and combinations thereof.

This is a filtration method that provides steps of feeding water in the deep bed media, by: feeding vertically from the top down, vertically from the bottom up, horizontally, horizontally from at least one vertical feed-well, and combinations thereof.

This filtration method makes use of micro porous membranes, ultrafiltration membranes, nanofiltration membranes, woven textile, woven textile with microporous openings, non-woven textile, non-woven textile with microporous openings, flat membranes, membranes forming expanding-contracting cells, hollow fiber membranes, membranes submerged into deep bed medium, membranes positioned above the deep bed medium within the expansion volume during the backwash, membranes positioned under deep bed medium, membranes positioned vertically and surrounded by deep bed media, membranes uniformly distributed over the volume of deep bed media, membranes non-uniformly distributed over the volume of deep bed media.

The media aeration is provided in this method by steps of aerating continuously, periodically, intermittently, intermittently with regular durations and intervals, intermittently with irregular durations and intervals, intermittently with controllable periods and intervals, and combinations thereof.

In this method reagents are added to water being treated: coagulants, polymers, flocculants, alkalis, acids, metal salts, metal ions with variable valence, multivalent metal ions, carbon particles, powdered activated carbon, powdered coal, granular activated carbon, granular coal, air-oxygen based ozone, RedOx ion exchangers.

Solid material accumulates in the deep bed filtration medium and on the membrane during water treatment. Accumulated solids are simultaneously removed from the deep bed and the membrane without interrupting production of filtrate. This removing can be done by water backwash, water back-pulse, air back-pulse, air backwash, air-water backwash, backwash with air-oxygen based ozone, backwash with chlorine gas, backwash with chlorine dioxide, backwash with carbon dioxide, backwash with sulfur dioxide, and combinations thereof.

The membrane can be cleaned using back pulses with water saturated with carbon dioxide, ozone, chlorine dioxide, sulfur dioxide, hydrochloric acid, sodium hydroxide, and combinations thereof.

This method can be accommodated in existing or new units. For example, existing, modified and/or upgraded filters, granular bed filters, filters with multiple media, matrix (carcass) filters, dual flow filters, contact filters, filters with floating media, filters with polyethylene media, filters with squeezable media, fuzzy media filters, foamed plastic media filters, filters with moving bed, settling tanks, clarifiers, final clarifiers, rectangular clarifies, rectangular settling tanks, circular clarifiers, circular settling tanks, circular settling tanks with vertical water flow, circular clarifiers with vertical water flow, circular settling tanks with radial flow of water, circular clarifiers with radial water flow, settling tanks built-in biological treatment units, settling tanks combined with biological treatment units, biological treatment units with built-in, upflow suspended sludge blanket clarifiers, suspended sludge blanket clarifiers, suspended sludge blanket separators, fluidized bed reactors can be used.

In some of these modifications and upgrades, a well with means for evacuating a liquid including the second filtrate can be provided so that second filtrate flows in the well by gravity, under vacuum, by a siphon, and is further evacuated from the well by a pump or other means.

In this method, the usual upper limit for contact filtration steps without flocculation-clarification may be expanded from the suspended solids concentration of 150 mg/l to as much as order of magnitude higher.

When water in this method is fed in the treatment steps at variable flow rate, including peak flows, a step of bypassing of a portion of the peak flows around membrane filtration can be provided. For example, peak flows at wastewater treatment plants during storm events may be filtered through the deep bed and partially discharged, with the balance of the flow being also filtered through the membrane media.

In this method, the filtration across the deep bed and membrane media occurs at a flow rate depending on a pressure differential applied across the deep bed and membrane media, and further providing a step of controlling the pressure differential, whereby the pressure differential is increased, or decreased, with increasing, or decreasing, the flow rate. For example, the collection pipes from membrane medium can be discharging under the water level in a well provided with automatically controlled pump (such as by variable frequency drive) capable of keeping water level in the well at lower elevations when the raw water flow increases. Lowering the water level in the well will increase the pressure differential across membrane and the flow of filtrate will increase. In this case, water can be storm water, wastewater, industrial wastewater, snowmelt, and combinations thereof.

This method can be applied to wastewater subjected to biological treatment with mixed liquor suspended solids, wherein steps of filtration across deep bed and membrane media are conducted after separating the bulk of the mixed liquor suspended solids from wastewater subjected to biological treatment. The biological treatment can be an aerobic biological treatment, a biological treatment with steps for nitrogen and phosphorus control, an anaerobic biological treatment, a combined anaerobic-aerobic biological treatment with mixed anaerobic and aerobic biomass, a combined anaerobic-aerobic-abiotic biological treatment with mixed anaerobic and aerobic biomass and with addition of metal ions having variable valence, a biological treatment with sludge reduction, a biological-abiotic treatment with sludge reduction, a biological treatment with sludge reduction and nitrogen and phosphorus control, a biological-abiotic treatment with nitrogen and phosphorus control, a method of thorough biological treatment producing reclaimed water, for example, such as acceptable for watering food crops with contact with edible parts, water that satisfies requirements for aquaculture, and/or water of drinking water quality.

This is also a method of water filtration comprising steps of filtration through at least one deep bed filter medium, whereby producing first filtrate, and collecting said filtrate by using membrane filtration elements positioned within or adjacent to the deep bed and being within the deep bed at least during backwash, whereby said membrane filtration elements are producing second filtrate. In addition to the improved suspended solids removal, membrane elements improve the performance of the deep bed. Particularly, using membrane elements that usually have greater hydraulic resistance than conventional filtrate collection means, permits a greater control over water flow distribution within the deep bed and therefore can be used for increasing the flow-through volume of the deep bed, and therefore, the dirt capacity and the duration of the filtration cycle for a given bed.

DETAILED DESCRIPTION OF THE EMBODIMENTS

Figure 1:
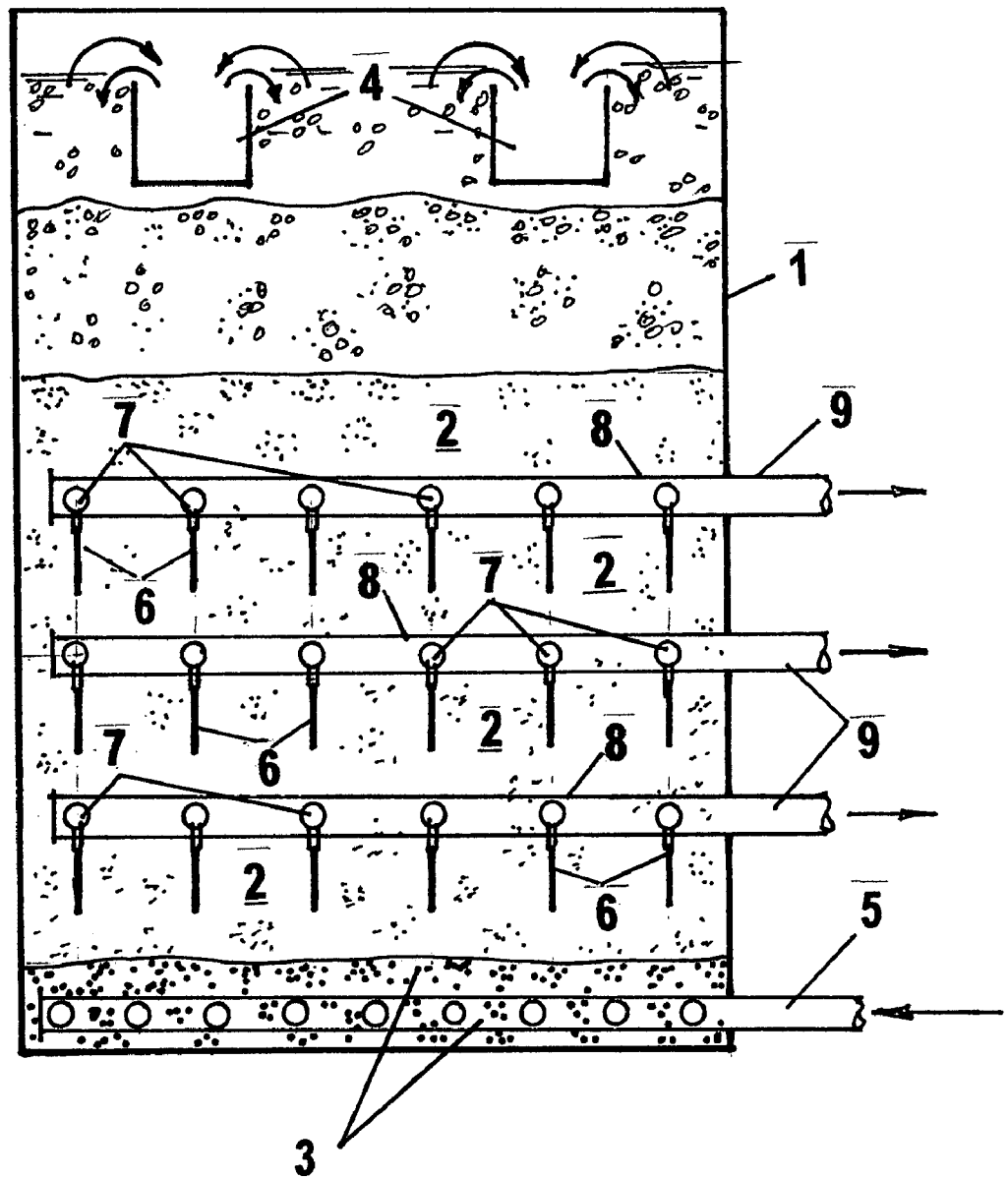
FIG. 1 is an elevation of a modified rapid filter converted into combined deep bed—membrane media filter.

FIG. 1 is an elevation of a modified rapid filter converted into combined deep bed—membrane media filter. It is understood that a similarly designed new combined deep-\bed—membrane media units can also be used. Such filters would consist of a tank 1 with preferably coarse media 2 (although, other media can be justified for particular applications), an existing underdrain system 3 and troughs 4 for colleting spent backwash water and for feeding raw water for filtration. Underdrain system is connected to pipe 5 that in non-modified filter would be used for collecting the filtrate and for feeding backwash water. In modified filters, pipes 5 are used for feeding raw water for filtration and for feeding also raw water at a greater flow rate for backwash. In drinking water supplies, the backwash water is the treated filtrate. Piping for feeding raw water to and evacuating spent backwash water from troughs 4 is not shown in FIG. 1, however, these piping is known to skilled artisans. Membrane filtration elements 6 are distributed over the volume of the (preferably) coarse media 2, elements 6 are in hydraulic communication with transverse pipes 7 and collection conduits 8 that are further connected to outside pipes 9. Membrane elements can be flat membranes, hollow fiber membranes, woven and non-woven fabric membranes, they may have different pore size and be made of chemically different materials as may be needed for the application.

The modified filter of FIG. 1 is operated as follows. The raw water influent is fed from the top via old troughs 4 and from the bottom through the old underdrain system 3, passes through coarse media 2 and becomes the first filtrate. The bulk of suspended solids and turbidity is removed in the deep bed 2. Other processes, for example biological, chemical, or physical chemical can also occur. The first filtrate, having only residual admixtures to the water being treated, is directed through membrane media of elements 6 and becomes the second filtrate, which is freed from the finest suspended solids, bacteria and often viruses. The second filtrate is collected in the system of pipes 7, 8, and 9 and is evacuated from the filter.

At the time when the deep bed accumulates a limiting mass and volume of deposits, the time can be detected, for example, by measuring hydraulic losses across deep bed, the deep bed is backwashed. The backwash is provided by increasing the flow of raw water from pipe 5 in the underdrain 3 and in the bed 2 so that the bed 2 is expanded and washed as known to skilled in art, but without interrupting the filtration across membranes in elements 6. The increased flow of raw water through the underdrain can be combined with air feed as in known air-water backwash systems. Simultaneously with the deep bed regeneration, the membrane elements are scrubbed and cleaned by the particles of the expanded deep bed media and air, if used, thus removing surface deposits. Back wash of the deep bed does not need to be carried to a thorough cleanliness as in conventional filters, because residual suspended solids in the bed pose no problem to the effluent (second filtrate) quality.

These filters, new or modified, can be used for municipal and industrial water purification, for the tertiary treatment of biologically treated wastewater, and for other applications in wastewater treatment.

It is clear that this filter modification is simple, can increase the throughput capacity of old filters several fold, produces simultaneous regeneration of the deep bed and the membrane elements, and reduces backwash water demand.

Figure 2:
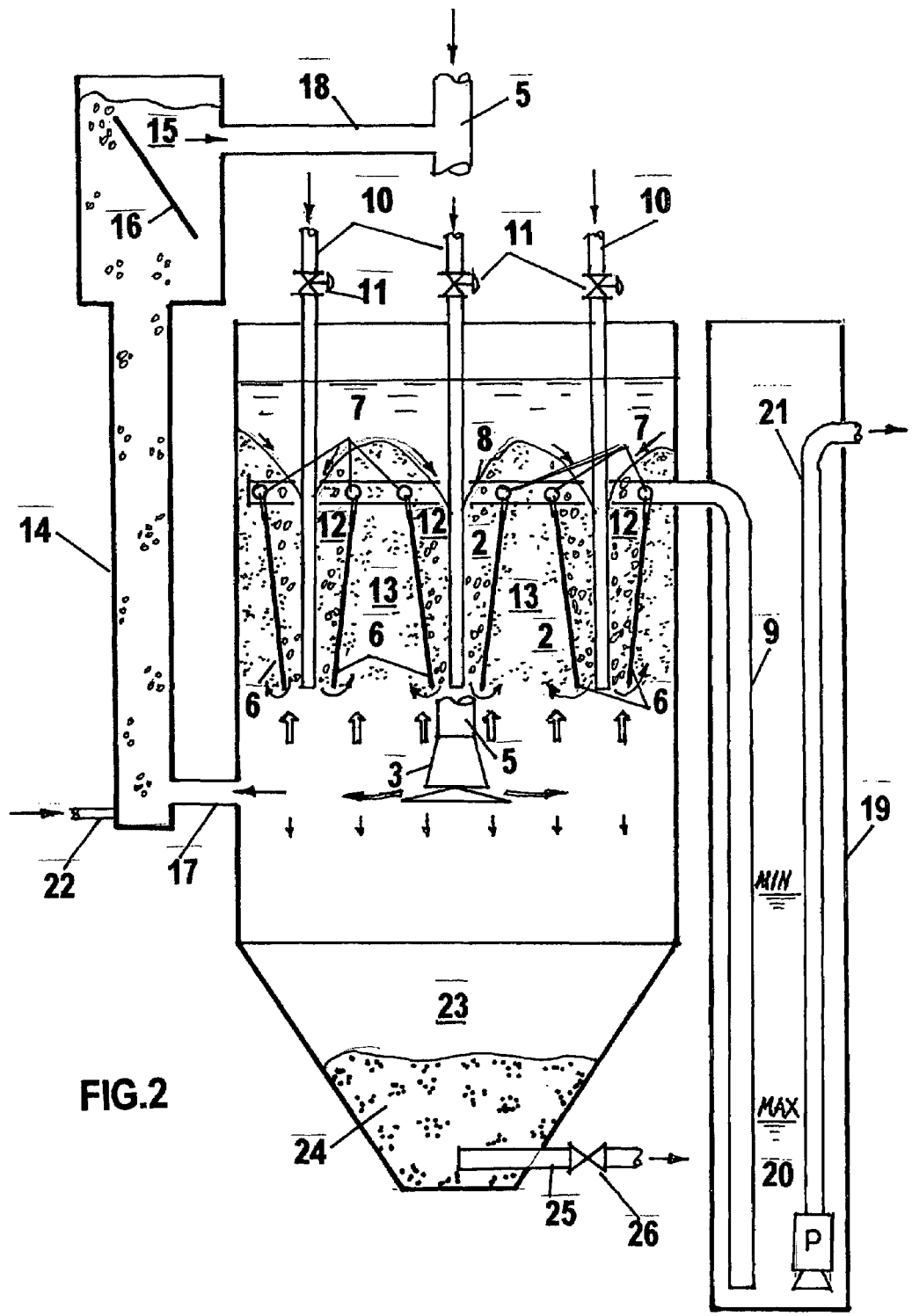
FIG. 2 is an elevation of a floating deep bed—membrane media filter.

FIG. 2 is an elevation of a floating deep bed—membrane media filter. The filter consists of tank 1 with deep bed 2 made of floating particles or floating rigid or flexible shapes. The raw water distribution means 3 and a feed pipe 5 are provided. Any presently known distribution means other than conical deflector shown in FIG. 2, or distribution means developed later can also be used. The filter further includes inclined plates 6 with membrane elements and second filtrate collection lines 7, lines 7 are intercepted by manifold portion of pipe 8 (not shown) and continuation of pipe 8 outside the filter tank 1. Line 8 is continued as a downcomer 9 installed in well 19 equipped with pump 20, preferably, pump 20 has a variable frequency drive, pump 20 has a discharge line 21 for evacuating the treated effluent (second filtrate). Plates 6 form expanding, 12, and contracting, 13, cells as described in the U.S. Pat. No. 4,472,358, which is made a part of this specification by inclusion. Expanding cells 12 are provided with air pipes 10 having solenoid valves 11. A gas transfer unit 14 is connected to the filter tank by line 17 and to the feed pipe 5 by line 18. The gas transfer unit is provided by gas feed line 22 and a gas bubble separator 15, optionally with inclined plate 16. A bottom section 23 is provided in the filter tank 1, section 23 accommodates volume 24 fro settled and, possibly, thickened sludge, section 23 is provided with a sludge discharge pipe 25 having valve 26.

The embodiment of FIG. 2 is operated as follows. The influent raw water and the recycled liquid from the gas transfer unit 14, if any, are fed in the bottom section of the filter tank 1 and are distributed essentially horizontally over the plan area of the tank 1. A portion of particles with higher settling velocity precipitate into the bottom section 23 and enter sludge volume 24, wherein further thickening occurs. The balance of the fed raw water is going essentially upward through the deep bed of floating particles 2, wherein the bulk of poorly settleable particles is intercepted by the deep bed material and becomes agglomerated and/or coagulated. As a result of removal of the bulk of the suspended sods from the raw water influent in the deep bed the first filtrate is formed. The first filtrate is further filtered through membranes in the inclined elements 6 and the second filtrate (clean effluent) is formed. The effluent is collected in pipes 7 and 8 and is transferred by a pipe 9 in the well 19. Several filters can discharge effluent in well 19. From well 19, effluent is evacuated by pump 20 via line 21. When the hydraulic resistance of the filtration system increases, for example, due to the increasing flow of raw water, or due to plugging of the deep bed 2 and membranes in the inclined elements 6, the pump 20 takes more water and lowers the water level in the well 19, thus increasing the available hydraulic head for filtration. The cleaning of the deep bed and membrane filtration media is achieved either by continuous or periodic air (and/or other gas) backwash via lines 10. When a gas is bubbled in sections 12, water with gas bubbles becomes less dense than the floating media (for example media made of polyethylene) and particles or shapes of the floating media sink in sections 12. In sections 12, particles of the removed admixtures are washed off from the deep bed media. The surfaces of the membranes within cells 12 are also washed by the moving air bubbles and the deep bed particles (or shapes). The detached deposits also sink in sections 12 and go to the bottom into the sludge volume 24. When the deep bed particles reach the lower edge of sections 12 wherein air bubbles are not present, they are transferred into sections 13. In sections 13, the entire mass of the deep bed is slowly moving upward, intercepts the suspended solids within the bed volume and cleans adjacent membranes by scrubbing. At the top of sections 13, deep bed particles move towards sections 12 to replace the sinking portion of the bed, enter sections 12 and sink down as described. Accordingly, there is a circulation of the deep bed media between sections 12 and 13.

It is understood that many modifications of the system of FIG. 2 is possible, for example, vertical elements 6 instead of inclined can be used, hollow fiber membranes can be used instead of flat elements, membranes can be made of fine pore textile materials, the floating bed and membrane filters can be built-in existing large diameter circular (radial flow) clarifiers, the bottom sludge collection can be provided with mechanisms such as used in or similar to (modified) large diameter circular (radial flow) clarifiers, gas mass transfer units 14 and/or wells 19 can be built-in the filter tank, units 14 and/or "aeration" lines 10 can be fed with air and/or gases other than air, for example, carbon dioxide, sulfur dioxide, etc. Membranes can be provided with back pulse cleaning option; the back pulse can be complemented by using water saturated with carbon dioxide under pressure, ozone, active chlorine, chlorine dioxide, sulfur dioxide, and mixtures of these gases. Other reagents listed in the section Summary of Invention can be incorporated in the system of FIG. 2.

The system of FIG. 2 has all advantages of the embodiment of FIG. 1 and other advantages listed elsewhere in this specification.

The specification, examples given by embodiments of FIGS. 1 and 2, and claims provide sufficient directions to skilled in art to use the present invention in multitude of designs. It is not possible and not necessary to present all possible process variants that can be derived from this invention in this specification. It will be therefore understood by those skilled in art, to whom this specification and claims are directed to, that that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

The invention claimed is:

1. A method of water treatment comprising treatment steps of sequential filtration of said water through at least one deep bed medium producing at least one first filtrate followed by at least one membrane medium filtration producing at least one second filtrate, wherein said membrane medium is at least periodically within said deep bed media.

2. The method of claim 1, wherein said water is selected from the group consisting of water from natural source water, process water, sanitary wastewater, industrial wastewater, aqueous suspension, aqueous emulsion, aqueous solution, non aqueous liquids, process liquids, industrial liquids, and combinations thereof.

3. The method of claim 1 wherein said treatment is selected from the group consisting of removing of suspended solids, removing of organic suspended particles, removing of inorganic suspended particles, removal of turbidity, removal of dissolved organic matter, removal of BOD, removal of COD, removal of TOC, removal of dissolved inorganic matter, precipitation of dissolved solids as low soluble compounds, chemical oxidation of organic matter, chemical oxidation of inorganic matter, chemical reduction of organic matter, chemical reduction of inorganic matter, electrochemical oxidation of organic matter, electrochemical oxidation of inorganic matter, electrochemical reduction of organic matter, electrochemical reduction of inorganic matter, biological oxidation of organic matter, biological oxidation of inorganic matter, biological reduction of organic matter, biological reduction of inorganic matter, removal of heavy metals, removal of trace elements, removal of selenium, removal of toxic organic matter, removal of recalcitrant organic matter, removal of dyes, removal of color, removal of surfactants, removal of compounds determined as methylene blue, removal of oil and grease, removal of nitrogen containing compounds, removal of ammonia, removal of nitrates and nitrites, removal of phosphorus, removal of iron, removal of manganese, removal of radioactive constituents, removal of calcium carbonate, removal of struvite, removal of bacteria, removal of viruses, removal of heavy metals, removal of precious metals, removal of process water constituents for recovery, and combinations thereof.

4. The method of claim 1 wherein said water flows across said deep bed and said membrane media under pressure differential created by steps selected from the group consisting of applying pressure, applying vacuum, and combinations thereof.

5. The method of claim 4, wherein said step of applying vacuum is selected from the group consisting of using vacuum pumps in combination with gravity transfer of said second filtrate, suction lines of water pumps, wells in combination with water pumps, wells in combination with gaslifts, wells in combination with airlifts and combinations thereof, whereby said well can have any shape and can be called otherwise.

6. The method of claim 1 wherein at least two deep bed media are used, the first of said two media is a floating medium, the second of said two media is heavier than said water or lighter than water and restrained, the first said medium is forming an upper filtration bed and the second said medium is forming the lower filtration bed, a membrane filtration element is positioned between said upper and said lower beds, wherein said water treatment comprises steps of downflow filtration across said upper bed and forming the upper first filtrate, and upflow filtration across lower bed forming the lower first filtrate, followed by filtration across said membrane element forming second filtrate.

7. The method of claim 6, wherein said upper and said lower beds are dimensioned to form a gap filled by said first upper and lower filtrates in the range from zero height to the height accommodating said membrane elements.

8. The method of claim 1, wherein at least two deep bed media are provided, at least one medium is heavier than water and at least one medium is lighter than water, and further providing step of mixing said heavier and said lighter media by air and water and producing mixed media, and conducting step of water filtration through said mixed media.

9. The method of claim 1, wherein the volume including said deep bed media is subjected to steps selected from the group consistina of physical, physical-chemical, and chemical actions.

10. The method of claim 9, wherein said physical, physical-chemical, and chemical actions are selected from the group consisting of mechanical vibrations, ultrasound, mixing by water flows induced by water moving means, mixing by air flows, bed expansion by said water flows, bed expansion by said air flows, aeration of said bed, application of electromagnetic fields with the use of external source of electric power, application of electromagnetic fields generated by heterogeneous electrochemical reactions within said tree-dimensional bed, application of at least one magnetic field with the use of electromagnets, application of at least one electromagnetic field with the use of permanent magnets, and combinations thereof.

11. The method of claim 1, and further providing step of feeding reagents into said deep bed.

12. The method of claim 11, wherein said step of feeding reagents is selected from the group consisting of feeding dissolved reagents, feeding particulate reagents, feeding emulsified reagents, feeding dispersed gaseous reagents, feeding oxidizing reagents, feeding reducing reagents, feeding pH correcting reagents, feeding reagents for controlling acid-base reactions, feeding buffering reagents, feeding oxygen-air mixtures with the fraction of oxygen in the mixture from 0% to 100%, feeding carbon dioxide, feeding sulfur dioxide, feeding chlorine dioxide, feeding ozone produced from air-oxygen mixtures with oxygen fraction in the mixture from 0% to 100%, feeding iron salts, feeding aluminum salts, feeding powdered coal, feeding granular coal, feeding powdered activated carbon, feeding granular activated carbon, feeding adsorption resins, feeding ion exchange resins, feeding RedOx resins, reagents addition of reagents to said water subjected to said treatment is provided.

13. The method of claim 1 wherein at least two deep bed media are used, the first of said two media is a floating medium, the second of said two medium is heavier than said water, said first and said second media are mixed and said filtration step is provided through said mixed media.

14. The method of claim 1, wherein said deep bed medium is selected from the group consisting of granular medium, sand, anthracite, garnet, ilmenite, glass, crushed glass, ceramic, crushed ceramic, plastic beads, metal beads, shaped ceramic elements, shaped glass elements, shaped plastic elements, shaped metal elements, fibrous elements, fibrous glass elements, fibrous ceramic elements, fibrous plastic elements, fibrous metal elements, steel wool, rigid medium, flexible medium, medium that can be squeezed, floating medium, medium heavier than water, synthetic plastic or mineral media, diatomaceous earth, resins, granular activated carbon, green sand, surface treated media, and combinations thereof.

15. The method of claim 1, wherein said filtration comprises processes selected from the group consisting of mechanical interception of suspended solid particles, physical-chemical interception of suspended solid particles, physical chemical transformations of admixtures, coagulation, chemical transformations of admixtures, electrochemical transformation of admixtures, biological transformation of admixtures, biological growth, removal of nitrogen, removal of phosphorus, removal of recalcitrant organics, removal of endocrine disrupters, removal of color, removal of dies, removal of BOD, removal of COD, removal of inorganic admixtures, and combinations thereof.

16. The method of claim 1 and further providing steps of feeding said water in said deep bed media, said steps of feeding are selected from a group consisting of feeding vertically from the top down, vertically from the bottom up, horizontally from at least one vertical feed-well, and combinations thereof.

17. The method of claim 1, wherein said membrane is selected from the group consisting of micro porous membranes, ultrafiltration membranes, nanofiltration membranes, synthetic plastic membranes, synthetic polymer membranes, ceramic membranes with micropores, ceramic membranes with ultrapores, ceramic membranes with nanopores, woven textile membranes, woven textile membranes with micropores, non woven membranes, non woven membranes with micropores, membranes forming expanding-contracting cells, hollow fiber membranes, membranes submerged into deep bed medium, membranes positioned above the deep bed medium, membranes positioned under deep bed medium, membranes positioned vertically and surrounded by deep bed media, membranes uniformly distributed over the volume of deep bed media, membranes non-uniformly distributed over the volume of deep bed media, and combinations thereof.

18. The method of claim 1, wherein a step of media aeration is provided, and further providing said step of aeration selected from the group consisting of continuously, periodically, intermittently, intermittently with regular durations and intervals, intermittently with irregular durations and intervals, intermittently with controllable periods and intervals, and combinations thereof.

19. The method of claim 1 and further providing addition of reagents to said water being treated, whereby reagents are selected from the group consisting of reagents for improving target processes in said method of claim 1, and reagents intended for maintaining the operation of the method in accordance with claim 1.

20. Method of claim 19, wherein said reagents are selected from the group consisting of coagulants, polymers, flocculants, alkalis, acids, carbonic acid as gas, carbonic acid as an oversaturated solution produced under pressure, air, oxygen, oxygen as an oversaturated solution produced under pressure, chlorine dioxide, chlorine dioxide solution, sulfur dioxide, sulfur dioxide solution, metal salts, metal ions with variable valence, multivalent metal ions, carbon particles, powdered activated carbon, powdered coal, granular activated carbon, granular coal, air-oxygen based ozone, RedOx ion exchangers, and combinations thereof.

21. The method of claim 1, wherein solid material accumulates in said at least one deep bed medium and on said membrane during said water treatment, and further providing a step of simultaneously removing said solids from said deep bed and said membrane without interrupting said membrane filtration step.

22. The method of claim 21, wherein said step of removing said solids is selected from the group consistina of water backwash, air backwash, air-water backwash, backwash with air-oxygen based ozone, backwash with chlorine gas, backwash with chlorine dioxide, carbonic acid as gas, carbonic acid as an oversaturated solution produced under pressure, and combinations thereof.

23. The method of claim 1, wherein said membrane is back washed with back pulses selected from the group consisting of water back-pulse, reagent back pulse, back pulse with air-oxygen based ozone using air-oxygen mixtures of any proportion, back pulse with carbon dioxide solution, back pulse with saturated carbon dioxide solution, back pulse with sulfur dioxide solution, back pulse with saturated sulfur dioxide solution, back pulse with chlorine dioxide solution, back pulse with saturated chlorine dioxide solution, back pulse with acidic solution, back pulse with alkaline solution, back pulse with hydrogen chloride, back pulse with sodium hydroxide solution, and combinations thereof.

24. The method of claim 23, wherein said combinations are selected from the group consisting of sequential back pulse combinations and simultaneous back pulse combinations.

25. The method of claim 1, wherein said treatment steps are accommodated in units selected from the group consisting of filters, granular bed filters, filters with multiple media, matrix (carcass) filters, continuous flow/continuous backwash filters, dual flow filters, contact filters, filters with floating media, filters with polyethylene media, filters with squeezable media, fuzzy media filters, foamed plastic media filters, filters with moving bed, settling tanks, clarifiers, final clarifiers, rectangular clarifies, rectangular settling tanks, circular clarifiers, circular settling tanks, circular settling tanks with vertical water flow, circular clarifiers with vertical water flow, circular settling tanks with radial flow of water, circular clarifiers with radial water flow, settling tanks built-in biological treatment units, settling tanks combined with biological treatment units, clarifiers built-in biological treatment units, upflow suspended sludge blanket clarifiers, suspended sludge blanket clarifiers, suspended sludge blanket separators, fluidized bed reactors, and combinations thereof.

26. The method of claim 25, wherein a well with means for evacuating a liquid including said second filtrate is provided for step of collecting said second filtrate, and further providing a step of evacuation of said collected second filtrate from said well.

27. The method of claim 1, wherein said treatment steps are accommodated in modified and upgraded units selected from the group consisting of filters, granular bed filters, filters with multiple media, matrix (carcass) filters, continuous flow/continuous backwash filters, dual flow filters, contact filters, filters with floating media, filters with polyethylene media, filters with squeezable media, fuzzy media filters, foamed plastic media filters, filters with moving bed, settling tanks, clarifiers, final clarifiers, rectangular clarifies, rectangular settling tanks, circular clarifiers, circular settling tanks, circular settling tanks with vertical water flow, circular clarifiers with vertical water flow, circular settling tanks with radial flow of water, circular clarifiers with radial water flow, settling tanks built-in biological treatment units, settling tanks combined with biological treatment units, clarifiers built-in biological treatment units, upflow suspended sludge blanket clarifiers, suspended sludge blanket clarifiers, suspended sludge blanket separators, fluidized bed reactors, and combinations thereof.

28. The method of claim 1, wherein said water treatment is conducted using contact filtration steps with direct flocculation-clarification in the deep bed of suspended solids at concentration up to 1500 mg/l.

29. The method of claim 1 wherein said water is fed in said treatment steps at variable flow rate, including peak flows, and further providing a step of bypassing of a portion of said peak flows around said steps of membrane filtration.

30. The method of claim 29, wherein said water is selected from the group consisting of storm water, sanitary wastewater, industrial wastewater, snowmelt, and combinations thereof.

31. The method of claim 1, wherein said filtration steps across said deep bad and said membrane media occur at a flow rate depending on a pressure differential applied across said deep bed and said membrane media, and further providing a step of controlling said pressure differential, whereby said pressure differential is increased, or decreased, with increasing, or decreasing, of said flow rate.

32. The method of claim 1, wherein said water is wastewater subjected to biological treatment with mixed liquor suspended solids, and said steps of filtration across deep bed and membrane media are conducted after separating the bulk of said mixed liquor suspended solids from said wastewater subjected to biological treatment.

33. The method of claim 1, wherein said water is wastewater subjected to biological treatment with mixed liquor suspended solids, and said steps of filtration across deep bed and membrane media are conducted directly.

34. The method of claim 33, wherein said biological treatment is selected from the group consisting of aerobic biological treatment, biological treatment with steps for nitrogen and phosphorus control, anaerobic biological treatment, combined anaerobic-aerobic biological treatment, combined anaerobic-aerobic-abiotic biological treatment, biological treatment with sludge reduction, biological-abiotic treatment with sludge reduction, biological treatment with sludge reduction and nitrogen and phosphorus control, biological-abiotic treatment with nitrogen and phosphorus control, biological treatment with side-stream processing, and combinations thereof.

35. A method of water filtration comprising steps of filtration through at least one deep bed filter medium, thereby producing first filtrate, and collecting said filtrate-by using membrane filtration elements, wherein said membrane medium is at least periodically within said deep bed media.

* * * * *